US010862595B2

(12) United States Patent
Yang et al.

(10) Patent No.: US 10,862,595 B2
(45) Date of Patent: Dec. 8, 2020

(54) METHOD FOR PROCESSING RADIO FREQUENCY INTERFERENCE, AND ELECTRONIC DEVICE

(71) Applicant: GUANGDONG OPPO MOBILE TELECOMMUNICATIONS CORP., LTD., Guangdong (CN)

(72) Inventors: Huai Yang, Guangdong (CN); Kui Fu, Guangdong (CN); Zaicheng Chen, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/690,189

(22) Filed: Nov. 21, 2019

(65) Prior Publication Data

US 2020/0092016 A1 Mar. 19, 2020

Related U.S. Application Data

(63) Continuation of application No. PCT/CN2018/087897, filed on May 22, 2018.

(30) Foreign Application Priority Data

May 23, 2017 (CN) .......................... 2017 1 0370076

(51) Int. Cl.
*H04B 15/02* (2006.01)
*H04B 17/00* (2015.01)
(Continued)

(52) U.S. Cl.
CPC .............. *H04B 15/02* (2013.01); *G09G 5/14* (2013.01); *G09G 5/373* (2013.01); *H04B 17/318* (2015.01)

(58) Field of Classification Search
CPC . H04B 1/04; H04B 1/38; H04B 15/02; H04B 15/04; H04B 17/23; H04B 17/318;
(Continued)

(56) References Cited

U.S. PATENT DOCUMENTS 7,123,945 B2 * 10/2006 Kokubo ............ H04M 1/72522
455/566
8,269,754 B2 * 9/2012 Nagata .................. G06F 3/1423
345/207
(Continued)

FOREIGN PATENT DOCUMENTS

CN 102789303 11/2012
CN 103544920 1/2014
(Continued)

OTHER PUBLICATIONS

WIPO, ISR for PCT/CN2018/087897, Aug. 9, 2018.
(Continued)

*Primary Examiner* — Quochien B Vuong
(74) *Attorney, Agent, or Firm* — Hodgson Russ LLP

(57) ABSTRACT

The present disclosure provides a method for radio frequency interference processing, comprising acquiring a first signal strength value of the first radio frequency antenna; determining whether the first signal strength value is lower than a preset threshold; and stopping the information display on the first area when the first signal strength value is lower than the preset threshold. The method reduces the interference from display components to radio frequency components, improve the efficiency of radio frequency communication.

20 Claims, 9 Drawing Sheets

(51) Int. Cl.
*H04B 17/318* (2015.01)
*G09G 5/14* (2006.01)
*G09G 5/373* (2006.01)

(58) Field of Classification Search
CPC ......... H04M 2250/16; H04M 2250/22; H04W 88/02; G09G 5/003; G09G 5/14
See application file for complete search history.

(56) References Cited

U.S. PATENT DOCUMENTS

| | | | |
|---|---|---|---|
| 8,917,249 B1 | 12/2014 | Buuck et al. | |
| 9,065,923 B2* | 6/2015 | Tomek | H04B 17/318 |
| 9,075,612 B2* | 7/2015 | Yang | G06F 1/3262 |
| 9,237,222 B2* | 1/2016 | Asano | H04W 4/60 |
| 10,120,550 B2* | 11/2018 | Kuo | G09G 5/38 |
| 10,509,616 B2* | 12/2019 | Kim | G06F 3/04845 |
| 2010/0141613 A1 | 6/2010 | Kaisha | |
| 2013/0321490 A1 | 12/2013 | Clark et al. | |

FOREIGN PATENT DOCUMENTS

| | | |
|---|---|---|
| CN | 103780273 | 5/2014 |
| CN | 105280145 | 1/2016 |
| CN | 105760070 | 7/2016 |
| CN | 105930125 | 9/2016 |
| CN | 106020423 | 10/2016 |
| CN | 106160759 | 11/2016 |
| CN | 106453843 | 2/2017 |
| CN | 107181559 | 9/2017 |
| FR | 2921215 | 3/2009 |
| WO | 2008056870 | 5/2008 |

OTHER PUBLICATIONS

SIPO, First Office Action for CN Application No. 201710370076.7, dated Oct. 25, 2018.
SIPO, Second Office Action for CN Application No. 201710370076.7, dated Jun. 3, 2019.
EPO, Office Action for EP Application No. 18805946.3, dated Apr. 30, 2020.
SIPO, Notification to Grant Patent Right for Invention for CN Application No. 201710370076.7, dated Sep. 4, 2019.

* cited by examiner

METHOD FOR PROCESSING RADIO FREQUENCY INTERFERENCE, AND ELECTRONIC DEVICE

CROSS-REFERENCE TO RELATED APPLICATIONS

This application is a continuation of International Application No. PCT/CN2018/087897, filed on May 22, 2018, which claims priority to Chinese Patent Application No. 201710370076.7, filed on May 23, 2017, the entire disclosures of which are incorporated herein by reference.

TECHNICAL FIELD

The present disclosure relates to electronic device communication technologies, and particularly to a method for processing radio frequency interference and an electronic device.

BACKGROUND

At present, with the development of electronic device communication technologies, people have higher and higher requirements for communication functions of electronic device, and radio frequency interference has always been an important factor affecting the communication function of electronic device. Radio frequency communication interference includes not only interference between RF components, but also interference from other components on the electronic device to RF components, such as motor components, camera components, display components.

For example, when the display component is in operation, a high-order harmonic component will be generated and may cause certain interference to the communication of the radio frequency component. When the communication signal of the electronic device is strong, the high-order harmonic component fails to affect the communication signal. When the electronic device is in a weak communication signal, the high-order harmonic component may cause greater interference to the communication signal of the electronic device, thereby affecting the use.

SUMMARY

The present disclosure aims to solve at least one of the technical problems in the related art to some extent.

Therefore, the present disclosure provides a method for processing radio frequency interference and electronic device, applied to electronic device, it can reduce the interference from display components to radio frequency components.

In a first aspect, the embodiment of the present disclosure provides a method for processing radio frequency interference, which is applied to an electronic device. The electronic device includes a display screen and a first radio frequency antenna, the display screen includes a first area and a second area, the first radio frequency antenna is located in the first area.

Wherein the method includes:
acquiring a first signal strength value of the first radio frequency antenna;
determining whether the first signal strength value is lower than a preset threshold;
stopping the information display on the first area when determining that the first signal strength value is lower than the preset threshold.

The embodiment of the disclosure also provides the following technical solution.

A radio frequency interference processing device, includes:
an acquiring module, configured to acquire first signal strength value of the first radio frequency antenna;
a determining module, configured to determine whether the first signal strength value is lower than a preset threshold;
a stopping module, configured to stop the information display on the first area when the first signal strength value is determined not lower than the preset threshold.

The embodiment of the disclosure also provides the following technical solution.

A computer readable storage medium with a computer program stored therein. When the program is executed by a processor, the method of processing radio frequency interference described in the embodiment of the disclosure is performed.

The embodiment of the disclosure also provides the following technical solution.

An electronic device, includes:
a memory having executable program codes stored therein;
a processor coupled to the memory;
the processor invokes the executable program codes stored in the memory to perform the method for processing radio frequency interference as described in the embodiment of the disclosure.

The embodiment of the disclosure also provides the following technical solution.

An electronic device, includes:
a first radio frequency antenna;
a display screen, comprising a first area and an adjacent second area, an orthographic projection of the first radio frequency antenna on the display screen being located in the first area;
a control circuit, configured to control the first radio frequency antenna to obtain a first signal strength value; and
a processor, connected with the first radio frequency antenna, the display screen, and the control circuit, the processor being configured to:
determine whether the first signal strength value is lower than a preset threshold;
stop the information display on the first area, when the first signal strength value is lower than a preset threshold.

BRIEF DESCRIPTION OF THE DRAWINGS

Specific embodiments of the present disclosure will be described in detail below with reference to the drawings, to enable the technical solutions and other advantageous effects of the present disclosure are apparent.

DETAILED DESCRIPTION

Figure 1:
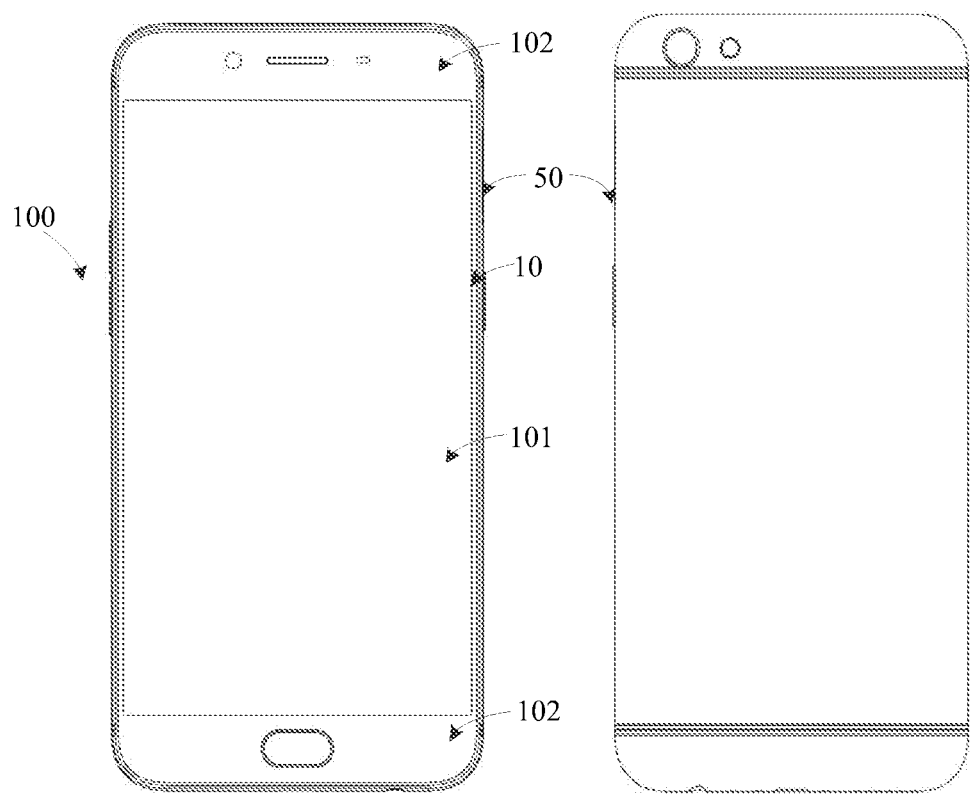
FIG. 1 is a schematic structural view of an electronic device according to an embodiment of the present disclosure.

Referring to the drawings, wherein the same reference numerals refer to the same components, the principles of the invention are illustrated in the context of a suitable computing environment. The following description is based on the specific embodiments of the invention and should not be construed as limiting of the invention.

The term "module" as used herein may be taken to mean a software object that is executed on the computing system. The different components, modules, engines, and services described herein can be considered as implementation objects on the computing system. The apparatus and method herein are preferably implemented in software, and may of course be implemented in hardware, all of which are within the scope of the present invention.

Detailed description is as follows.

In this embodiment, the processing device of the radio frequency interference is described. The processing device of the radio frequency interference may be integrated into an electronic device, such as a mobile phone, a tablet computer, a personal digital assistant (PDA), or the like.

Figure 2:
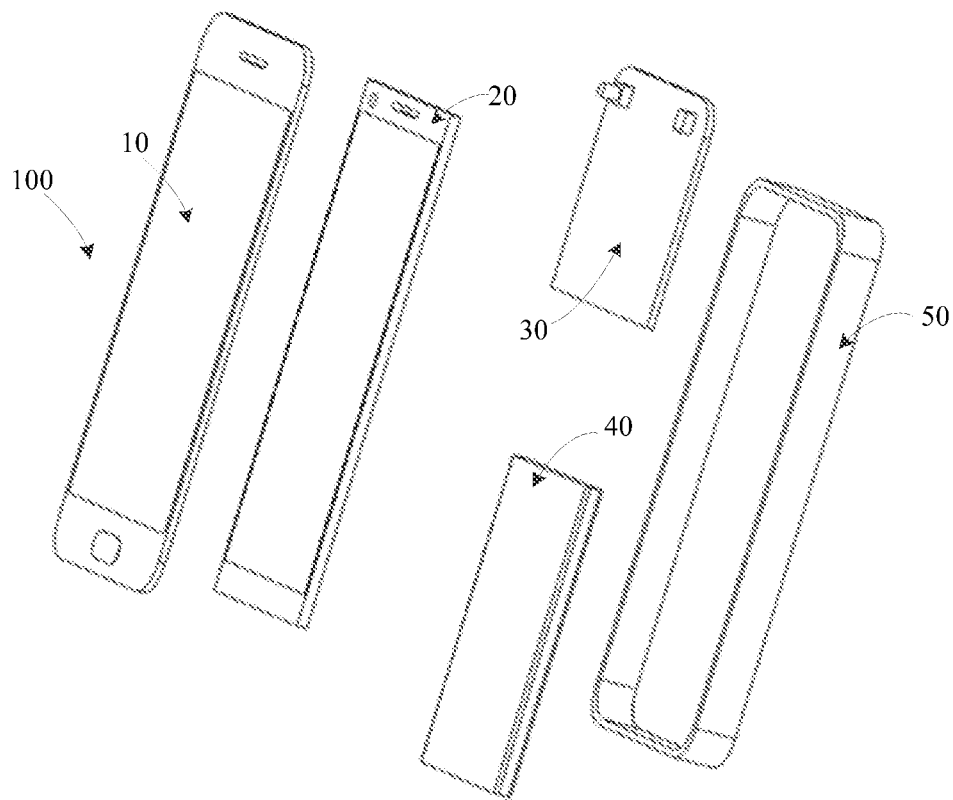
FIG. 2 is an exploded perspective view of the electronic device shown in FIG. 1.

Referring to FIG. 1 and FIG. 2, an electronic device 100 includes a cover 10, a display screen 20, a printed circuit board 30, a battery 40, and a housing 50.

The cover 10 is mounted to the display screen 20 and covers the display screen 20. The cover 10 can be a transparent glass cover. In an embodiment, the cover 10 may be a cover glass made of a material such as sapphire. The cover 10 includes a display area 101 and a non-display area 102. The display area 101 can be used to display information of electronic devices or for users to control by touch. The top area of the non-display area 102 is provided with a hole for transmitting signals of sound or light. Functional components such as a fingerprint module and touch buttons can be set on the bottom of the non-display area 102.

The display screen 20 is mounted under the cover 10 to form a display surface of the electronic device 100. In one possible embodiment, the display screen 20 can be divided into a first area and a second area, and the area occupied by the first area and the second area can be equal. In another possible embodiment, the display screen 20 can be divided into a first area, a second area and a third area, and the area occupied by the first area, the second area and the third area can be equal. It should be noted that after partitioning, either partition can be turned on or off by the processor.

The printed circuit board 30 is mounted inside the housing 50. The printed circuit board 30 can be used as the motherboard of the electronic device 100. The printed circuit board 30 can be integrated with functional components such as an antenna, a microphone, a camera, a light sensor, a receiver, a processor and the like. Meanwhile, the display screen 20 is electrically connected to the printed circuit board 30.

The battery 40 is mounted inside the housing 50, and the battery 40 is electrically connected to the printed circuit board 30 to provide power to the electronic device 100.

The housing 50 and the cover 10 can be cooperated to form a closed space.

The embodiment of the invention provides a method for processing the radio frequency interference, which is applied to an electronic device. The electronic device includes a display screen and a first radio frequency antenna, the display screen includes a first area and a second area, an orthographic projection of the first radio frequency antenna on the display screen is located in the first area. The method includes:

acquiring a first signal strength value of the first radio frequency antenna;

determining whether the first signal strength value is lower than a preset threshold;

stopping the information display on the first area when determining that the first signal strength value is lower than the preset threshold.

In one embodiment, the electronic device also includes a second radio frequency antenna, and the display screen also includes a third area, an orthographic projection of the second radio frequency antenna on the display screen is located in the third area, the second area is located between the first area and the third area.

In one embodiment, the method also includes: acquiring the second signal strength value of the second radio frequency antenna, determining whether the second signal strength value is lower than the preset threshold, stopping the information display on the third area when detecting that the second signal strength value is lower than the preset threshold.

In one embodiment, the electronic device also includes a third radio frequency antenna, an orthographic projection of the third radio frequency antenna on the display screen is located in the second area.

In one embodiment, after stopping the information display on the first area, the method further includes: acquiring the second signal strength value of the third radio frequency antenna, determining whether the second signal strength value is lower than the first signal strength value, enabling the information display on the first area and stopping the information display on the second area, when detecting that the second signal strength value is lower than the first signal strength value.

In one embodiment, after determining whether the second signal strength value is lower than the first signal strength value, the method may include: keeping the information display on the second area when determining that the second signal strength value is not lower than the first signal strength value.

In one embodiment, after stopping the information display on the first area the method may further includes: acquiring the current time point when determining that the first signal strength value is not lower than the preset threshold; calculating a duration in which the first signal strength value is not lower than the preset threshold from the current time point; and enabling the information display on the first area, when the duration exceeds a preset time threshold.

In one embodiment, after enabling the information display on the first area, the method may further includes: acquiring the display content information of the electronic device; calculating the size ratio value between the second area and the display screen, according to the size ratio value; adjusting the proportion of the display content information; and displaying the display content information which has been adjusted.

In one embodiment, after stopping the information display on the third area, the method may further includes: when the second signal strength value is judged not to be lower than the preset threshold, acquiring the current time point, calculating a duration in which the second signal strength value is not lower than the preset threshold from the time point, and enabling the information display on the third area when the duration exceeds the preset time threshold.

Figure 3:
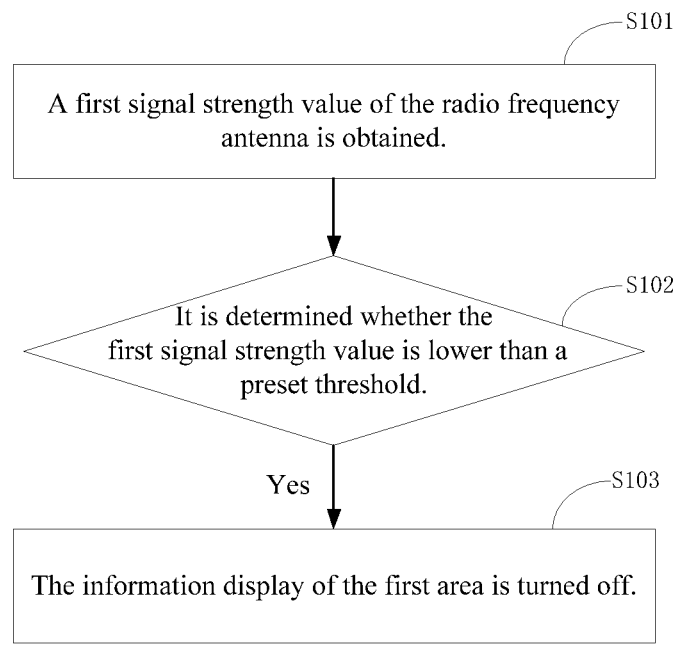
FIG. 3 is a schematic flowchart view of the method for processing the radio frequency interference according to an embodiment of the present disclosure.

Please refer to FIG. 3, FIG. 3 is a schematic flowchart view of the method for processing the radio frequency interference according to an embodiment of the present disclosure. Specifically, the method includes the following steps.

Figure 4:
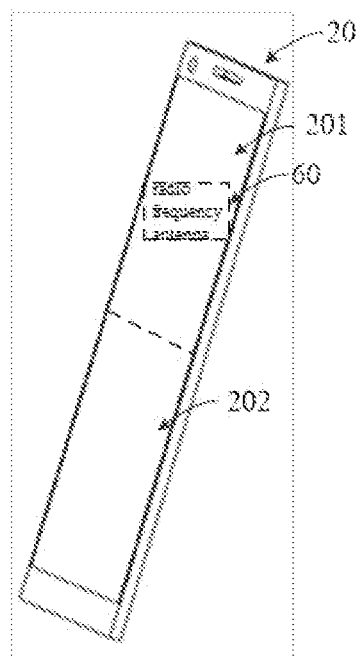
FIG. 4 is a schematic structural view of a display screen according to an embodiment of the present disclosure.

It should be noted, the method for processing the radio frequency interference in this embodiment is applied to an electronic device as shown in FIG. 4, which is a schematic structural view of a display screen. The electronic device includes a display screen 20 and a first radio frequency antenna 60, the display screen 20 includes a first area 201 and a second area 202, an orthographic projection of the first radio frequency antenna 60 on the display screen 20 is located in the first area 201.

In a step S101, a first signal strength value of the first radio frequency antenna is obtained.

It should be noted, the first signal strength value is the received value when the first radio frequency antenna 60 receiving signals.

The first signal strength value is obtained in real time when the first radio frequency antenna receiving signals, and the current radio frequency communication quality of electronic device is evaluated according to the first signal strength value.

In a step S102, it is determined whether the first signal strength value is lower than a preset threshold.

It should be noted, the display screen 20 will generate high-order harmonic components when it works. And the high-order harmonic component will cause certain interference to the communication of the first radio frequency antenna 60. When the communication signal of electronic device is strong, the high-order harmonic component is not enough to affect the communication signal of electronic device. However, when the communication signal of electronic device is weak, the high-order harmonic component will cause great interference to the communication signal of electronic device.

The preset threshold is a judgment value to judge whether the strength of communication signals of the first radio frequency antenna 60 is strong or weak. When the first signal strength value of the first radio frequency antenna 60 is higher than the preset threshold value, it indicates that the current communication signal of the first radio frequency antenna 60 is strong. When the first signal strength value of the first radio frequency antenna 60 is lower than the preset threshold value, it indicates that the current communication signal of the first radio frequency antenna 60 is weak.

Further, when the first signal strength value is judged to be lower than the preset threshold value, a step S103 is performed; when it is determined that the first signal strength value is not lower than the preset threshold, it is returned to perform the step S101.

In the step 103, the information display on the first area is stopped.

When the first signal strength value is judged to be lower than the preset threshold value, it indicates that the current communication signal of the first radio frequency antenna 60 is weak. At this time, the high-order harmonic component generated during the operation of display screen 20 is easy to cause serious interference to the first radio frequency antenna 60.

Further, when the information display on the first area 201 is stopped, it makes the display screen 20 only use the second area 202 to display information. Because the first radio frequency antenna 60 is located in the first area 201, the operation of stopping the information display on the first area 201 can reduce the communication interference on the first area 201 to the first radio frequency antenna 60.

In one embodiment, after stopping the information display on the first area 201, the method may also include the follows.

(1) When the first signal strength value is not lower than the preset threshold, the current time point is obtained.

It is understood that, when the communication signal of the first radio frequency antenna 60 is strong, it is not necessary to turn off the information display on the first area 201.

Further, when it is determined that the first signal strength value of the first radio frequency antenna 60 is not lower than the preset threshold, it means that the current communication signal of the first radio frequency antenna 60 is strong, at this time, the current time point is obtained, such as 18:00 P.M.

(2) A duration in which the first signal strength value is not lower than the preset threshold is calculated from the time point.

The timing is ended when the first signal strength value of the first radio frequency antenna 60 is lower than the preset threshold value, and the timing is continued when the first signal strength value of the first radio frequency antenna 60 is not lower than the preset threshold value, to calculate the duration.

(3) When the duration exceeds a preset time threshold, the information display on the first area is enabled.

When the duration exceeds the preset time threshold, it means that the current communication signal of the first radio frequency antenna 60 is maintained at a strong level, the information display on the first area, that has been stopped previously, can be enabled.

For example, the preset time threshold is 1 minute. When it is determined that the first signal strength value is not lower than the preset threshold, the current time point is 18:00 and the duration of the first signal strength value not lower than the preset threshold is calculated from 18:00, when the duration exceeds 1 minute, the information display on the first area, that has been deactivated, is reactivated.

In one embodiment, after stopping the information display on the first area 201, the method may also include the followings.

(1) The display content information of the electronic device is obtained.

After the operation of stopping the information display on the first area 201, the display content information of the display screen 20 is obtained.

(2) A size ratio value on the second area to the display screen is calculated.

The size ratio value on the second area to the display screen can be calculated by the display area value on the second area 202 divided by the display area of the display screen 20. For example, when the size ratio value on the second area 202 to the display screen 20 is 0.5, it means that the second area 202 is half of the display screen 20.

(3) According to the size ratio value, the proportion of the display content information is adjusted, and the display content information which has been adjusted is displayed on the display screen.

According to the size ratio value, the proportion of the display content information can be adjusted, for example, when the size ratio value is 0.5, the display content information is reduced to half of the original proportion and displayed on the second area 202.

According to the above descriptions, this embodiment provides a method for processing radio frequency interference, including the steps of acquiring the first signal strength value of the first radio frequency antenna, and stopping the information display on the first area when the first signal strength value is judged to be lower than a preset threshold acquiring. So, the interference of display panel components to radio frequency components is reduced, and the efficiency of radio frequency communication is improved.

In accordance with the method described in the above embodiments, further details are illustrated below.

Figure 5:
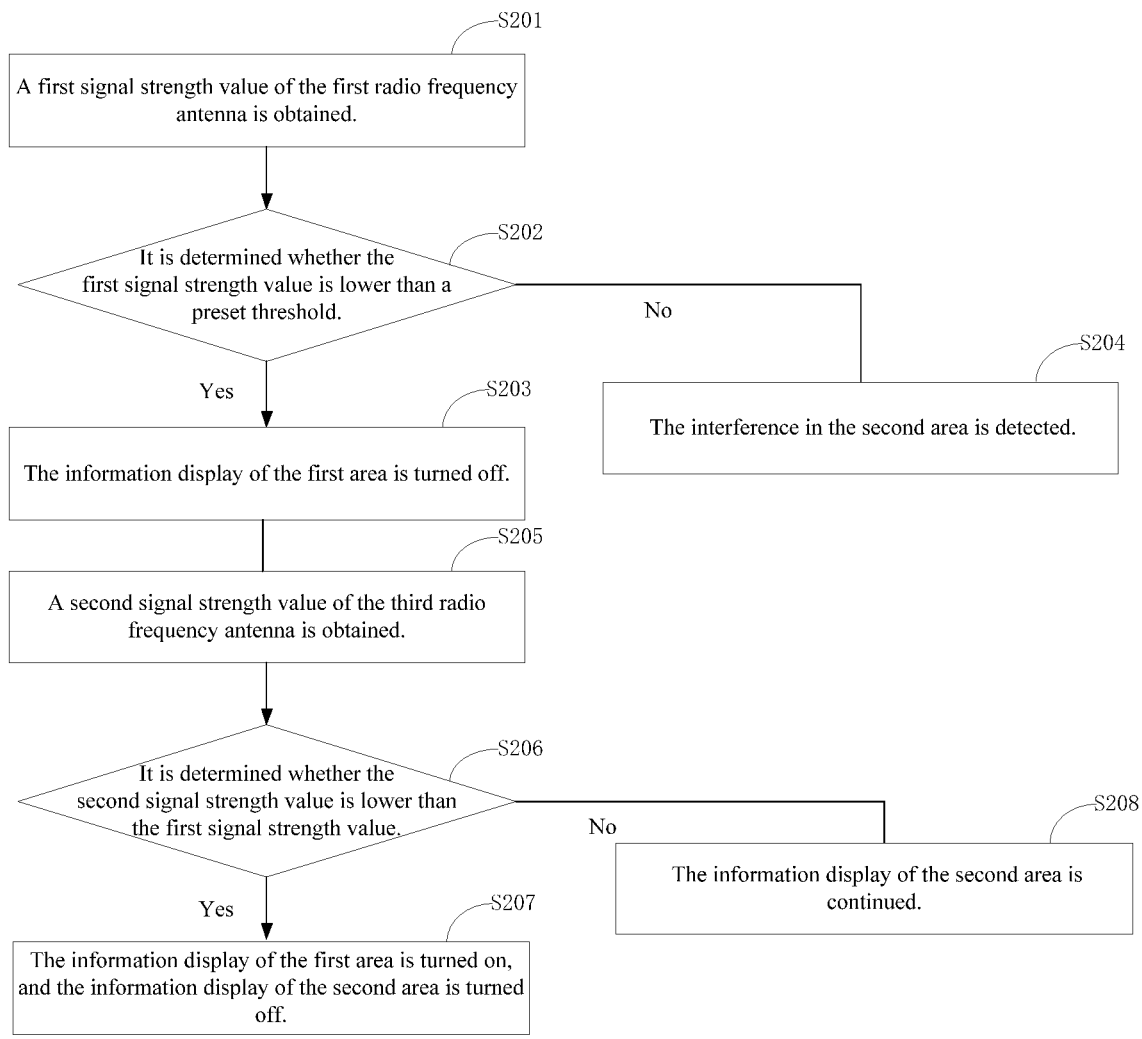
FIG. 5 is a schematic flowchart view of another method for processing the radio frequency interference according to an embodiment of the present disclosure.

Please refer to FIG. 5, FIG. 5 is a schematic flowchart view of method for processing the radio frequency interference according to an embodiment of the present disclosure.

Specifically, the method includes the following steps.

Figure 6:
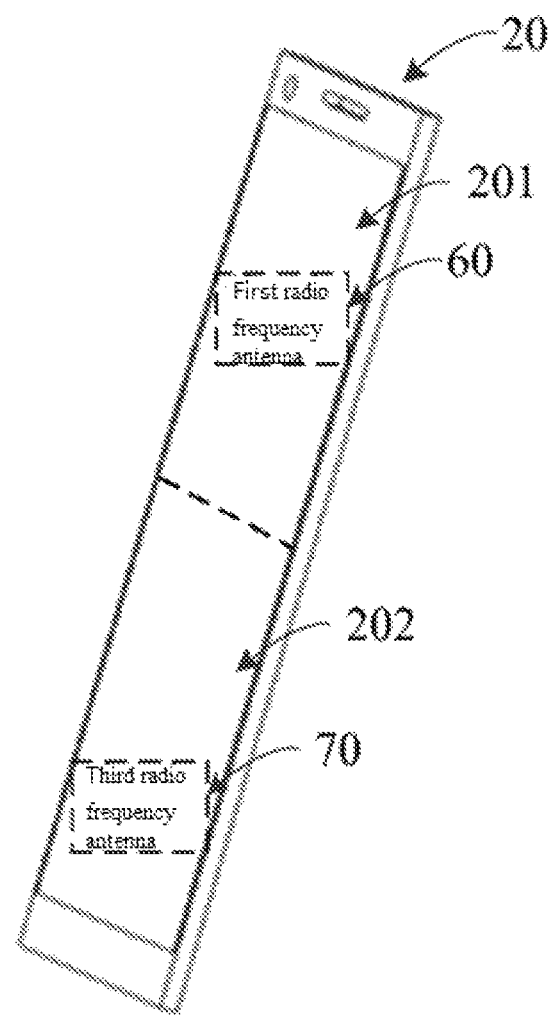
FIG. 6 is a schematic structural view of another display screen according to an embodiment of the present disclosure.

It should be noted, the method for processing the radio frequency interference in this embodiment is applied to an electronic device as shown in FIG. 6, which is another schematic structural view of a display screen. The electronic device includes a display screen 20, a first radio frequency antenna 60 and a third radio frequency antenna 70, the display screen 20 includes a first area 201 and a second area 202, an orthographic projection of the first radio frequency antenna 60 on the display screen 20 is located in the first area 201, an orthographic projection of the third radio frequency antenna 70 on the display screen 20 is located in the second area 202.

In a step S201: a first signal strength value of the first radio frequency antenna is obtained.

Wherein, the first signal strength value is obtained in real time when the first radio frequency antenna receiving signals, and the current radio frequency communication quality of the first radio frequency antenna 60 of the electronic device is evaluated according to the first signal strength value.

In a step S202: it is determined whether the first signal strength value is lower than a preset threshold.

Wherein, the preset threshold is a judgment value to judge whether the strength of communication signals of the radio frequency antenna 60 is strong or weak. When the first signal strength value of the first radio frequency antenna 60 is higher than the preset threshold value, it indicates that the current communication signal of the first radio frequency antenna 60 is strong. When the first signal strength value of the first radio frequency antenna 60 is lower than the preset threshold value, it indicates that the current communication signal of the first radio frequency antenna 60 is weak.

Further, when the first signal strength value is judged to be lower than the preset threshold value, a step S203 is performed; when it is determined that the first signal strength value is not lower than the preset threshold, a step S204 is performed.

In the step 203: the information display on the first area is turned off.

When the first signal strength value is judged to be lower than the preset threshold value, it indicates that the current communication signal of the first radio frequency antenna 60 is weak. At this time, the high-order harmonic component generated during the operation of display screen 20 is easy to cause serious interference to the first radio frequency antenna 60.

Further, when the information display on the first area 201 is stopped, it makes the display screen 20 only use the second area 202 to display information. Because the first radio frequency antenna 60 is located in the first area 201, the operation of stopping the information display on the first area 201 can reduce the communication interference on the first area 201 to the first radio frequency antenna 60.

In the step 204: the interference on the second area is detected.

When the first signal strength value is judged not lower than the preset threshold value, it indicates that the current communication signal of the first radio frequency antenna 60 is strong, so it is not necessary to stop the information display on the first area 201.

Specifically, the operation of detecting the interference on the second area is includes the following sub-steps.

(1): a second signal strength value of the third radio frequency antenna is obtained.

It should be noted, the second signal strength value is the received value when the third radio frequency antenna 70 receiving signals.

The second signal strength value is obtained in real time when the third radio frequency antenna receiving signals, and the current radio frequency communication quality of the third radio frequency antenna 70 of the electronic device is evaluated according to the second signal strength value.

(2): it is determined whether the second signal strength value is lower than the first signal strength value.

It should be noted, the second area 202 of the display screen 20 will generate a high-order harmonic component when it works. And the high-order harmonic component will cause certain interference to the communication of the third radio frequency antenna 70. When the communication signal of electronic device is strong, the high-order harmonic component is not enough to affect the communication signal of electronic device. However, when the communication signal of electronic device is weak, the high-order harmonic component will cause great interference to the communication signal of electronic device.

Further, when the second signal strength value is judged to be lower than the preset threshold value, a step (3) is performed; When it is determined that the first signal strength value is not lower than the preset threshold, the information display on the second area 202 is continued.

(3): the information display on the second area is stopped when the second signal strength value is judged to be lower than the preset threshold value.

When the information display on the second area 202 is stopped, it makes the display screen 20 only use the first area 201 to display information. Because the third radio frequency antenna 70 is located in the second area 202, the operation of stopping the information display on the second area 202 can reduce the communication interference on the second area 202 to the third radio frequency antenna 70.

In a step 205: a second signal strength value of the third radio frequency antenna is obtained.

The second signal strength value is obtained in real time when the third radio frequency antenna receiving signals, and the current radio frequency communication quality of the third radio frequency antenna 70 of the electronic device is evaluated according to the first signal strength value.

In a step 206: it is determined whether the second signal strength value is lower than the first signal strength value.

It should be noted, in order to keep the display screen 20 of the electronic device in working, one on the first area and the second area can be stopped.

When the second signal strength value is judged to be lower than the first signal strength, it indicates that the radio frequency communication quality of the third radio frequency antenna 70 is worse than the first radio frequency antenna 60. When the second signal strength value is judged to be not lower than the first signal strength, it indicates that the radio frequency communication quality of the third radio frequency antenna 70 is better than the first radio frequency antenna 60.

Further, when the second signal strength value is judged to be lower than the first signal strength value, a step S207 is performed, when the second signal strength value is judged not lower than the first signal strength value, a step S208 is performed.

In the step 207: the information display on the first area is enabled, and the information display on the second area is deactivated.

When the second signal strength value is judged to be lower than the first signal strength, it indicates that the radio frequency communication quality of the third radio frequency antenna 70 is worse than the first radio frequency antenna 60, the information display on the first area can be enabled, and the information display on the second area can be deactivated, the radio frequency interference to the third radio frequency antenna 70 in the second area 202 of the display screen 20 can be prioritized, the display content information of the electronic device is displayed on the first area 201.

In the step 208: the information display on the second area is continued.

When the second signal strength value is judged to be not lower than the first signal strength, it indicates that the radio frequency communication quality of the third radio frequency antenna 70 is better than the first radio frequency antenna 60, the information display on the second area is continued.

According to the above descriptions, this embodiment provides a method for processing radio frequency interference, including the steps of acquiring the first signal strength value of the first radio frequency antenna; after stopping the information display on the first area is turned off when the first signal strength value is judged to be lower than a preset threshold, acquiring a second signal strength value of the second radio frequency antenna, and enabling the information display on the first area and deactivating the information display on the second area, when the second signal strength value is judged to be lower than the first signal strength value. So, the interference of display panel components to radio frequency components is reduced, and the efficiency of radio frequency communication is improved.

Figure 7:
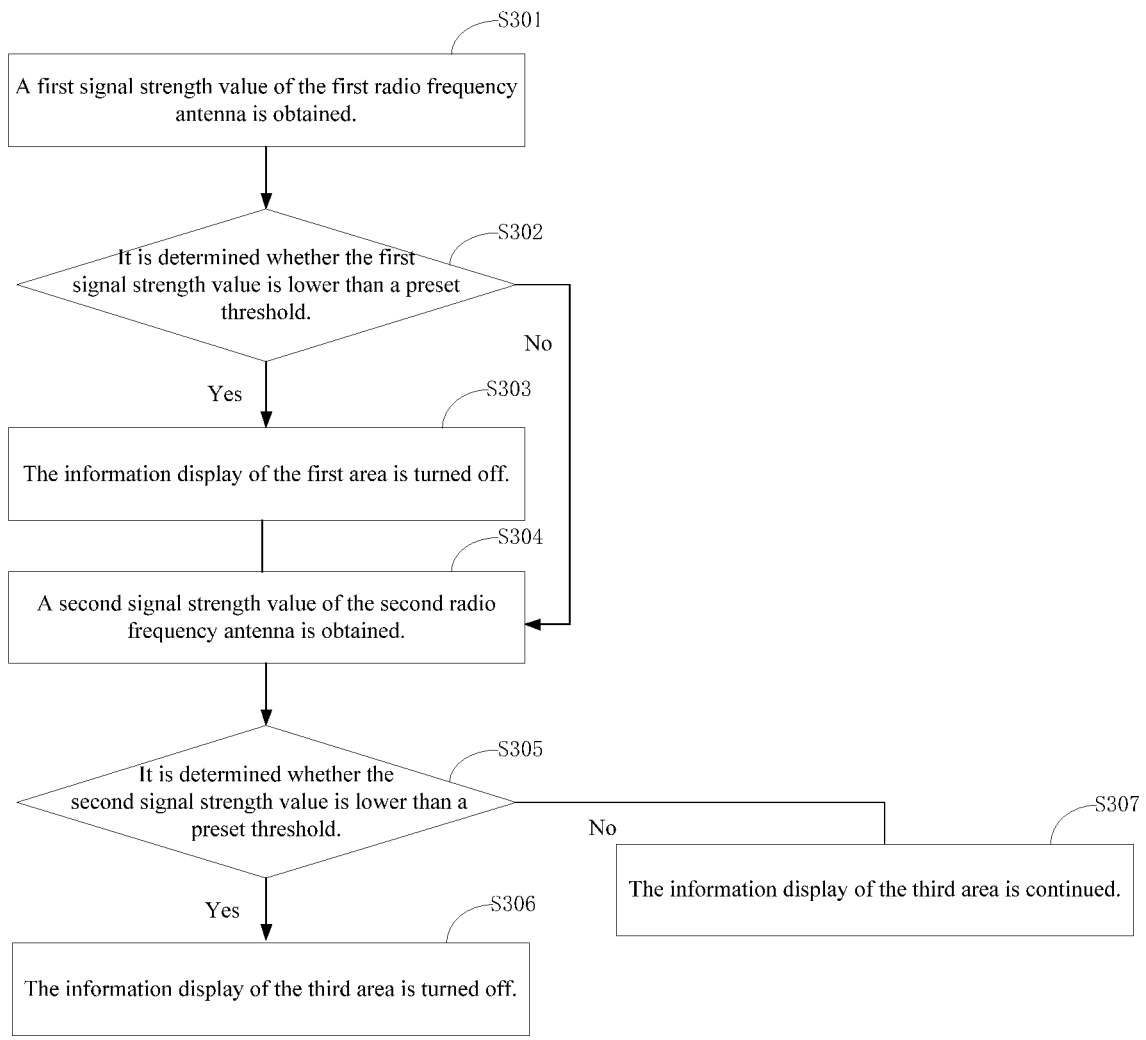
FIG. 7 is a schematic flowchart view of another method for processing the radio frequency interference according to an embodiment of the present disclosure.

Please refer to FIG. 7, FIG. 7 is another schematic flowchart view of a method for processing the radio frequency interference according to an embodiment of the present disclosure.

Specifically, the method includes the following steps.

Figure 8:
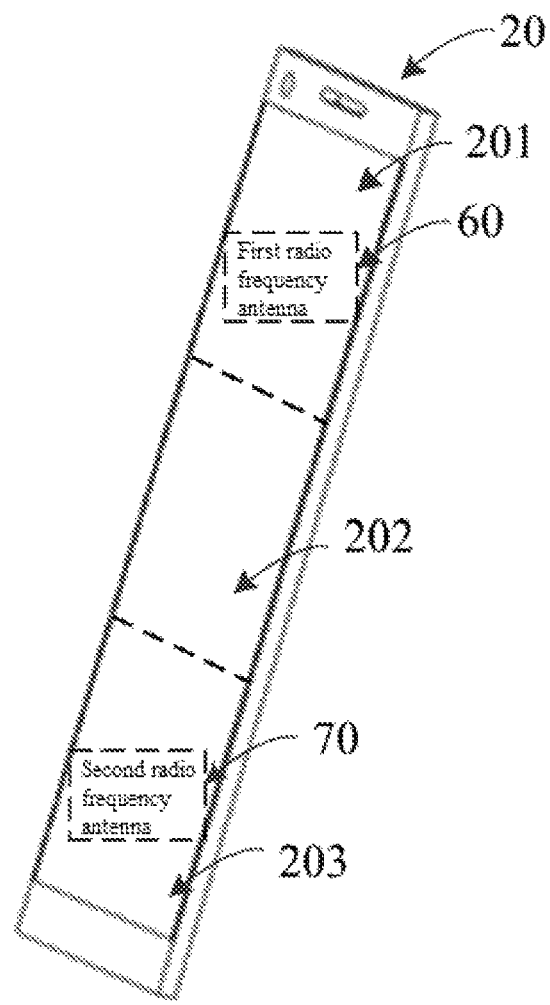
FIG. 8 is a schematic structural view of another display screen according to an embodiment of the present disclosure.

It should be noted, the method for processing the radio frequency interference in this embodiment is applied to an electronic device as shown in FIG. 8, which is a schematic structural view of a display screen. The electronic device includes a display screen 20, a first radio frequency antenna 60 and a second radio frequency antenna 70, the display screen 20 includes a first area 201, a second area 202 and a third area 203, an orthographic projection of the first radio frequency antenna 60 on the display screen 20 is located in the first area 201, an orthographic projection of the second radio frequency antenna 70 on the display screen 20 is located in the third area 203, the second area 202 is located between the first area 201 and the third area 203.

In a step 301: a first signal strength value of the first radio frequency antenna is obtained.

The first signal strength value is obtained in real time when the first radio frequency antenna receiving signals, and the current radio frequency communication quality of the first radio frequency antenna 60 of the electronic device is evaluated according to the first signal strength value acquiring.

In a step S302: it is determined whether the first signal strength value is lower than a preset threshold.

The preset threshold is a judgment value to judge whether the strength of communication signals of the first radio frequency antenna 60 is strong or weak. When the first signal strength value of the first radio frequency antenna 60 is higher than the preset threshold value, it indicates that the current communication signal of the first radio frequency antenna 60 is strong. When the first signal strength value of the first radio frequency antenna 60 is lower than the preset threshold value, it indicates that the current communication signal of the first radio frequency antenna 60 is weak.

Further, when the first signal strength value is judged to be lower than the preset threshold value, a step S303 is performed; when it is determined that the first signal strength value is not lower than the preset threshold, a step S304 is performed.

In the step 303: the information display on the first area is stopped and deactivated.

The information display on the first area 201 is stopped. Because the first radio frequency antenna 60 is located in the first area 201, the operation of stopping the information display on the first area 201 can reduce the communication interference on the first area 201 to the first radio frequency antenna 60.

Further, at this time, the display screen 20 displays the information through the second area 202 and the third area 203.

In the step 304: acquiring a second signal strength value of the second radio frequency antenna is obtained.

The second signal strength value is obtained in real time when the second radio frequency antenna 70 receiving signals, and the current radio frequency communication quality of the second frequency antenna 70 of the electronic device is evaluated according to the second signal strength value.

In a step 305: it is determined whether the second signal strength value is lower than a preset threshold.

The preset threshold is a judgment value to judge whether the strength of communication signals of the second radio frequency antenna 70 is strong or weak. When the second signal strength value of the second radio frequency antenna 70 is higher than the preset threshold value, it indicates that the current communication signal of the second radio frequency antenna 70 is strong. When the second signal strength value of the second radio frequency antenna 70 is lower than the preset threshold value, it indicates that the current communication signal of the second radio frequency antenna 70 is weak.

Further, when the second signal strength value is judged to be lower than the preset threshold value, a step S306 is performed; when it is determined that the second signal strength value is not lower than the preset threshold, a step S307 is performed.

In the step 306: the information display on the third area is stopped.

The information display on the third area 203 is stopped. Because the second radio frequency antenna 70 is located in the third area 203, the operation of stopping the information display on the third area 203 can reduce the communication interference on the third area 203 to the second radio frequency antenna 70.

Further, the second area 202 is used to display information, when the information display on the third area 203 and the first area 201 is stopped. The first area 201 and the second area 202 are used to display information, when the information display on the third area 203 is deactivated, and the information display on the first area 201 is enabled.

In one embodiment, after stopping the information display on the third area, the method may also include the followings:

(1) When the second signal strength value is not lower than the preset threshold, the current time point is obtained.

It is understood that, when the communication signal of the second radio frequency antenna 70 is strong, it is not necessary to turn off the information display on the third area 203.

Further, when it is determined that the second signal strength value is not lower than the preset threshold, it means that the current communication signal of the second radio frequency antenna 70 is strong, at this time, acquiring the current time point is obtained, such as 17:00 P.M.

(2) A duration in which the second signal strength value is not lower than the preset threshold is calculated from the time point.

The timing is ended when the second signal strength value of the second radio frequency antenna 70 is lower than the preset threshold value, and the timing is continued when the second signal strength value of the second radio frequency antenna 70 is not lower than the preset threshold value, to calculate the duration.

(3) When the duration exceeds a preset time threshold, the information display on the third area is enabled.

When the duration exceeds the preset time threshold, it means that the current communication signal of the second radio frequency antenna 70 is maintained at a strong level, the information display on the third area 203, that has been turned off previously, can be turned on.

In the step 307: the information display on the third area is continued.

According to the above descriptions, this embodiment provides a method for processing radio frequency interference, including the steps of acquiring the first signal strength value of the first radio frequency antenna; after stopping the information display on the first area when the first signal strength value is judged to be lower than a preset threshold, acquiring the second signal strength value of the second radio frequency antenna, and stopping the information display on the third area when the second signal strength value is judged to be lower than the preset threshold. Through the above steps, the interference of display panel components to radio frequency components is reduced, and the efficiency of radio frequency communication is improved.

In order to implement the above embodiments, the present disclosure also provides a radio frequency interference processing device. It should be noted that the foregoing description of the method embodiments is also applicable to the device of the embodiments, and the implementation principles are similar, and details are not described herein again.

Figure 9:
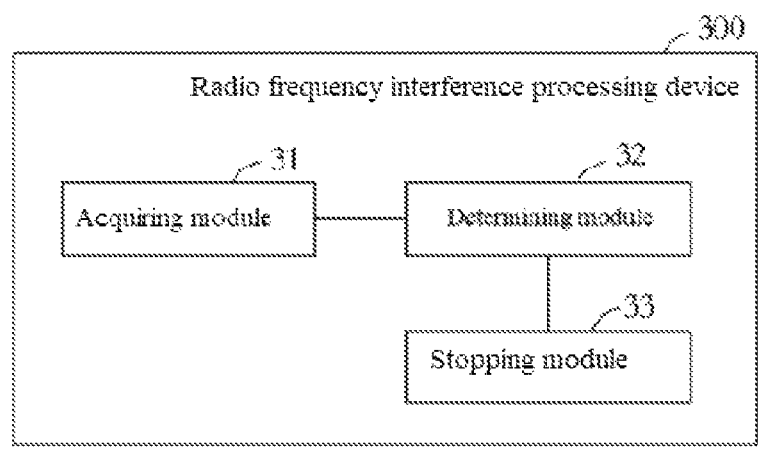
FIG. 9 is a schematic flowchart view of a device according to an embodiment of the present disclosure.

FIG. 9 is a schematic structural view of a device 300 for processing the radio frequency interference according to an embodiment of the present disclosure.

As shown in FIG. 9, the device 300 includes an acquiring module 31, a determining module 32 and a stopping module 33.

The acquiring module 31 is configured to acquire a first signal strength value of the first radio frequency antenna. According to the first signal strength value, the current radio frequency communication quality of electronic device can be evaluated.

The determining module 32 is configured to determine whether the first signal strength value is lower than a preset threshold.

The stopping module 33 is configured to stop the information display on the first area when determining that the first signal strength value is not lower than the preset threshold.

When the stopping module 33 stops the information display on the first area, it makes the display screen only use the second area to display information. Because the first radio frequency antenna is located in the first area, the operation of stopping the information display on the first area can reduce the communication interference on the first area to the radio frequency antenna.

Figure 10:
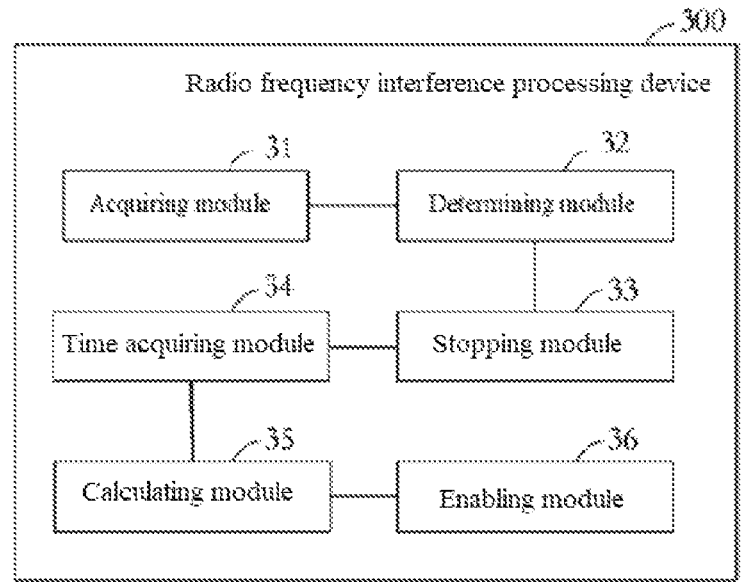
FIG. 10 is a schematic flowchart view of another device for processing radio frequency interference according to an embodiment of the present disclosure.

FIG. 10 is a schematic structural view of another device 300 for processing the radio frequency interference according to an embodiment of the present disclosure. In one embodiment, as shown in FIG. 10, the device 300 further includes a time acquiring module 34, a calculating module 35 and an enabling module 36.

The time acquiring module 34 is configured to acquire the current time point when determining that the first signal strength value is not lower than the preset threshold value.

The calculating module 35 is configured to calculate a duration in which the first signal strength value is not lower than the preset threshold from the time point.

The enabling module 36 is configured to enable the information display on the first area when the duration exceeds the preset time threshold.

When the duration exceeds the preset time threshold, it means that the current communication signal of the first radio frequency antenna is maintained at a strong level, at this time, the enabling module 36 enables the information display on the first area that has been deactivated.

In the device 300 for processing the radio frequency interference provided by the embodiments of the present disclosure, by acquiring the first signal strength value of the first radio frequency antenna, and stopping the information display on the first area when the first signal strength value is judged to be lower than a preset threshold, the interference of display panel components to radio frequency components is reduced and the efficiency of radio frequency communication is improved.

In order to implement the above embodiments, the present disclosure also provides an electronic device 400 including a memory 401, a sensor 402, an input unit 403, a display unit 404, a battery 405, a processor 406 including one or more processing cores, a control circuit 407 and a first radio frequency antenna 408. Those of ordinary skill in the art should understand that, the electronic device structure of the electronic device 400 shown in FIG. 11 does not constitute a restriction to the electronic device 400, and the electronic device 400 may include more or less components than that shown in FIG. 11, or includes some combination of the components, or includes different arrangements of the components.

The memory 401 can be configured to store applications and data. The memory 401 stores applications that contain executable codes. Applications can be composed of various functional modules. The processor 406 performs functional applications and data processing by running applications stored in the memory 401. In addition, the memory 401 may include high-speed random access memory and may also include non-volatile memory, such as at least one disk storage device, flash memory device, or other volatile solid-state storage device. Correspondingly, the memory 401 can also include a memory controller to provide access to the memory 401 by the processor 406 and the input unit 403.

The electronic device 400 also includes at least one kind of sensor 402, such as light sensor, gravity acceleration sensor and other sensors. Specifically, the light sensor can include the ambient light sensor and the proximity sensor, where the ambient light sensor can adjust the brightness of the display panel according to the brightness of the ambient light, the proximity sensor can turn off the display panel and/or backlight when the electronic device is moved to user ear. As a motion sensor, gravity acceleration sensor can detect all directions (usually three axis) acceleration, when gravity acceleration sensor still can detect the size and direction of gravity, it can be used to identify the attitude of the mobile phone applications (such as somehow the screen calibration switch, relevant game, magnetometer stance), vibration recognition related functions (such as a pedometer, percussion), etc. As for gyroscopes, barometers, hygrometers, thermometers, infrared sensors and other sensors that can be configured with electronic device, it is unnecessary to describe them here.

The input unit 403 can be configured to receive input numeric, character information or user characteristic information (such as fingerprint) and to generate signal inputs related with user configuration and function control, such as from a keyboard, a mouse, a joystick, an optical or a trackball. Specifically, in a specific embodiment, the input unit 403 may include a touch sensitive surface and other input devices. Touch sensitive surface, also known as touch display screen or touch panel, can collect user's touch operation on or near it (such as user's operation on or near the touch sensitive surface with finger, stylus and any suitable object or attachment), and drive the corresponding connection device according to the preset program. Optionally, the touch sensitive surface may include a touch detection device and a touch controller. The touch detection device detects the user's touch location, detects the signal brought by the touch operation, and transmits the signal to the touch controller, the touch controller receives touch information from the touch detection device, converts it into contact coordinates, sends it to the processor 406, and can receive and execute commands from the processor 406. In addition, various types of touch sensitive surfaces can be used, such as resistive, capacitive, infrared and surface acoustic. The input unit 403 may include other input devices in addition to touch sensitive surface, Specifically, other input devices may include, but are not limited to, one or more of the physical keyboard, function keys (such as volume control keys, switch keys, etc.), fingerprint identification module, trackball, mouse, joystick, etc.

The display unit 404 can be configured to display information entered by the user or provided to the user or various graphical user interfaces of electronic device. These graphical user interfaces can be composed any one of graphics, text, ICONS, video, and any combination thereof The display unit 404 may include a display screen. The display screen includes a first area and an adjacent second area, as described in the above embodiments. Further, the touch sensitive surface can cover the display panel. When the touch sensitive surface detects a touch operation on or near it, it is transmitted to the processor 406 to determine the type of touch event, and then the processor 406 provides corresponding visual output on the display screen based on the type of touch event. The touch sensitive surface and the display screen may be two independent parts to realize the output and input functions, and in some embodiments, the touch sensitive surface and the display panel can be integrated together realize the input and output functions.

The electronic devices 400 also includes a power supply 405 (such as a battery) powered for each component, the power supply 405 can be connected to the processor 406 logic through the power management system, so as to realize the functions of charge management, discharge management and power consumption management through the power management system. The power supply 405 may also include one or more DC or AC power supplies, recharging systems, power failure detection circuits, power converters or inverters, power status indicators, and other arbitrary components.

The processor 406 is the control center of the electronic device 400, is connected with all parts of the electronic device 400 with various interfaces and circuits, by running or performing the applications stored in the memory 401 and by invoking data stored in memory 401, to perform various functions and data processing of the electronic device 400 for overall monitoring of electronic device. Optionally, the processor 406 may include one or more processing cores, Preferably, the processor 406 integrates an application processor and a modem processor, where the application processor primarily handles operating systems, user interfaces, and applications.

The first radio frequency antenna 408 is connected to the processor 406, an orthographic projection of the first radio frequency antenna 408 on the display screen is located in the first area of the display screen;

The control circuit 407 is connected to the processor 406 and the first radio frequency antenna 408, and the control circuit 407 is configured to control the first radio frequency antenna 408 to obtain a first signal strength value.

Figure 11:
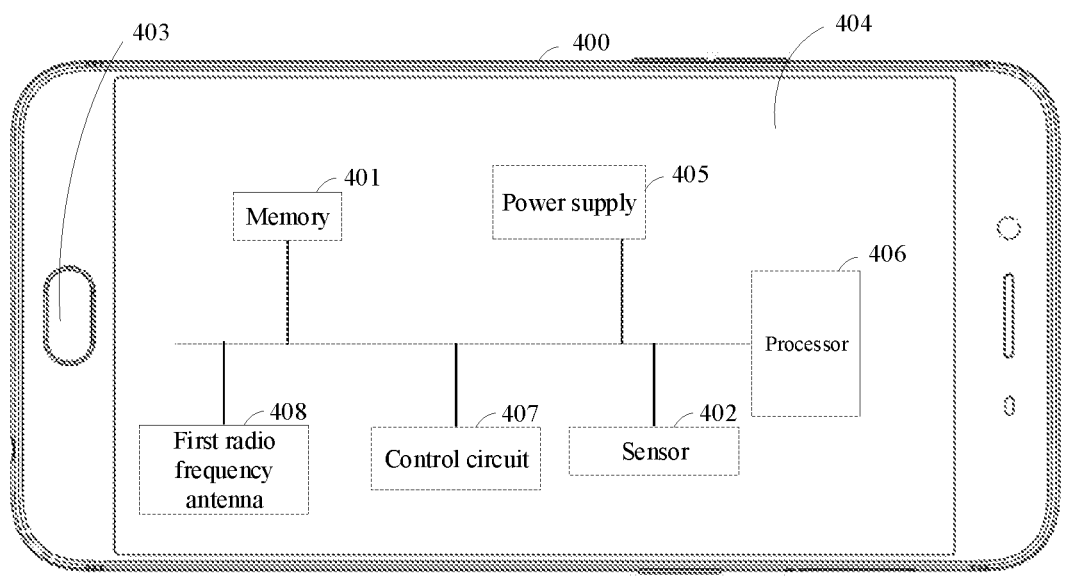
FIG. 11 is a schematic structural view of another electronic device according to an embodiment of the present disclosure.

Although not shown in FIG. 11, the electronic device 400 can also include RF components, cameras, Bluetooth modules, network modules, etc., which are not described here.

In this embodiment, the processor is configured to: determine whether the first signal strength value is lower than a preset threshold, and stop the information display on the first area when determining that the first signal strength value is lower than the preset threshold.

In one embodiment, the processor 406 is further configured to: acquire a current time point when determining that the first signal strength value is judged not to be lower than the preset threshold, calculate the duration in which the first signal strength value is not lower than the preset threshold from the time point, and enable the information display on the first area when the duration exceeds a preset time threshold.

In one embodiment, after the processor 406 performs the step of stopping the information display on the first area, the processor 406 can also perform the following steps: acquiring the display content information of the electronic device; calculating a size ratio value on the second area to the display screen; and adjusting a proportion of the display content information according to the size ratio value, and displaying the adjusted display content information on the second area.

Figure 12:
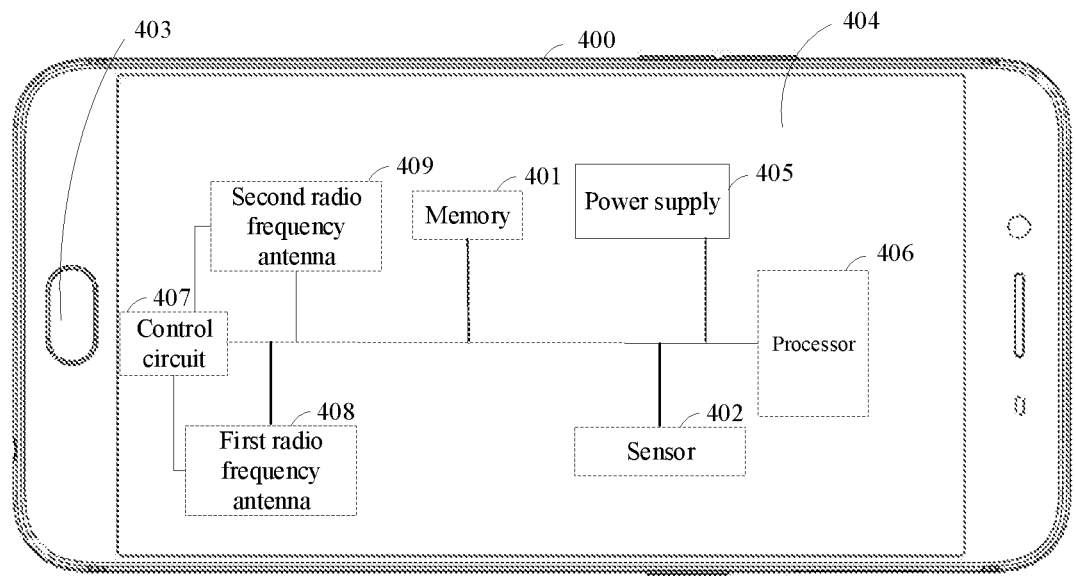
FIG. 12 is a schematic structural view of still another electronic device according to an embodiment of the present disclosure.

In one embodiment, as illustrated in FIG. 12, the display screen can also include a third area, and the second area is located between the first area and the third area. The electronic device further include a second radio frequency antenna 409, and an orthographic projection of the second radio frequency antenna 409 on the display screen is located in the third area. The second radio frequency antenna 409 is connected to the processor 406 and the control circuit 407, the control circuit 407 is further configured to control the second radio frequency antenna 409 to obtain a second signal strength value.

In one embodiment, after the processor 406 performs the step of determining whether the second signal strength value is lower than the preset threshold, the processor 406 can also perform the following steps: keeping the information display on the third area when determining that the second signal strength value is not lower than the first signal strength value.

Figure 13:
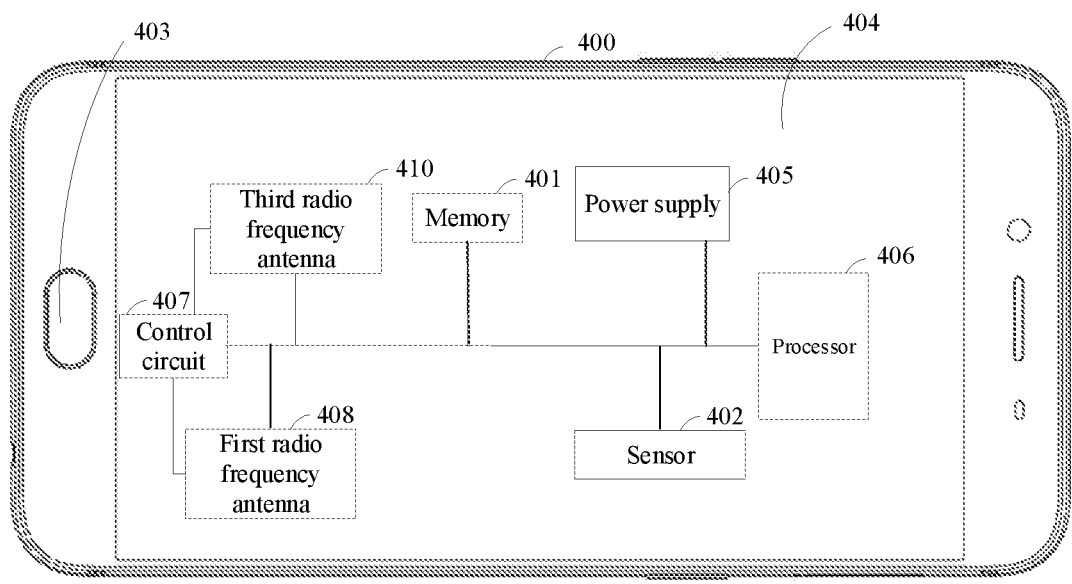
FIG. 13 is a schematic structural view of still another electronic device according to an embodiment of the present disclosure.

In one embodiment, as illustrated in FIG. 13, the electronic device 400 further includes a third radio frequency antenna 410, and an orthographic projection of the third radio frequency antenna 410 on the display screen is located in the second area of the display screen. The third radio frequency antenna 410 is connected to the processor 406 and the control circuit 407, the control circuit 407 is further configured to control the third radio frequency antenna 410 to obtain a second signal strength value.

In one embodiment, the processor 406 further configured to: determines whether the second signal strength value is lower than the preset threshold, and stop the information display on the third area of the display screen when determining that the second signal strength value is lower than the preset threshold.

In one embodiment, after the processor 406 performs the step of stopping the information display on the third area, the processor 406 can also perform the following steps: acquiring a current time point when determining that the second signal strength value is lower than the preset threshold, calculating a duration in which the second signal strength value not lower than the preset threshold from the time point; and enabling the information display on the third area when the duration exceeds the preset time threshold.

In one embodiment, after the processor 406 performs the step of stopping the information display on the first area and making the display screen use the second area for information display, the processor 406 is further configured to: determine whether the second signal strength value is lower than the first signal strength value; and enable the information display on the first area and stopping the information display on the second area of the display screen, when the second signal strength value is lower than the first signal strength value.

In one embodiment, after the processor 406 performs the step of determining whether the second signal strength value is lower than the first signal strength value, the processor 406 can also perform the following steps: keeping the information display on the second area of the display screen when determining that the second signal strength value is not lower than the first signal strength value.

Since the electronic device 400 can perform any method for processing radio frequency interference provided by the embodiments, the beneficial effects that can be achieved by any method for processing radio frequency interference provided by the embodiments can be realized, as detailed in the previous embodiment, it is not necessary to be described here again.

In specific implementation, the above units can be implemented as independent entities, or can be arbitrarily combined and implemented as the same or several entities. The specific implementation of the above units can be referred to the previous method implementation example, which will not be repeated here.

The disclosure provides a method for processing radio frequency interference and electronic device, such as a mobile phone, a tablet PC, a Personal Digital Assistant (PDA) and so on. The electronic device, the device and method for processing radio frequency interference belong to the same conception. Any methods for processing the radio frequency interference of previous embodiments can be run on the radio frequency interference processing device, and the specific implementation process is detailed in the method embodiment of the radio frequency interference processing, which will not be described here.

It should be noted, ordinary skill in the art can understand that all or part of the steps carried by the method of implementing the above embodiments can be completed by a program to instruct related hardware, and the program can be stored in a computer readable storage medium, and when the program executed, the program may include one or a combination of the steps of the method embodiments. Wherein, the storage medium can be magnetic disk, optical disc, ROM (Read Only Memory), Random Access Memory, etc.

Above is a detailed introduction of the radio frequency interference processing method and electronic device provided by the embodiment of the invention. In this paper, specific examples are applied to elaborate the principle and implementation mode of the invention. The explanation of the above embodiments is only used to help understand the method of the invention and its core idea; Meanwhile, for technicians in the field, according to the idea of the invention, there will be changes in the specific implementation mode and application scope. In conclusion, the contents of this specification shall not be interpreted as restrictions on the invention.

What is claimed is:

1. A method for processing radio frequency interference, applied to an electronic device, wherein the electronic device includes a display screen, a first radio frequency antenna, and a third radio frequency antenna, the display screen includes a first area and an adjacent second area, an orthographic projection of the first radio frequency antenna on the display screen is located in the first area, an orthographic projection of the third radio frequency antenna on the display screen is located in the second area, the method comprising:

acquiring a first signal strength value of the first radio frequency antenna;

determining whether the first signal strength value is lower than a preset threshold; and stopping the information display on the first area when determining that the first signal strength value is lower than the preset threshold.

2. The method of claim 1, wherein the electronic device further comprises a second radio frequency antenna, and the display screen further comprises a third area, an orthographic projection of the second radio frequency antenna on the display screen is located in the third area, and the second area is located between the first area and the third area.

3. The method of claim 2, further comprising:
acquiring a second signal strength value of the second radio frequency antenna;
determining whether the second signal strength value is lower than the preset threshold; and
stopping the information display on the third area when determining that the second signal strength value is lower than the preset threshold.

4. The method of claim 3, after stopping the information display on the third area, the method further comprising:
acquiring a current time point when determining that the second signal strength value is lower than the preset threshold,
calculating a duration in which the second signal strength value not lower than the preset threshold from the time point; and
enabling the information display on the third area when the duration exceeds the preset time threshold.

5. The method of claim 1, after stopping the information display on the first area, the method further comprising:
acquiring a second signal strength value of the third radio frequency antenna;
determining whether the second signal strength value is lower than the first signal strength value; and
turning on the information display on the first area and turning off the information display on the second area, when the second signal strength value is lower than the first signal strength value.

6. The method of claim 5, after determining whether the second signal strength value is lower than the first signal strength value, the method further comprising:
keeping the information display on the second area when determining that the second signal strength value is not lower than the first signal strength value.

7. The method of claim 1, after tuning off the information display on the first area, the method further comprising:
acquiring a current time point when determining that the first signal strength value is not lower than the preset threshold,
calculating a duration in which the first signal strength value is not lower than the preset threshold from the time point; and
enabling the information display on the first area when the duration exceeds a preset time threshold.

8. The method of claim 1, after stopping the information display on the first area, the method further comprising:
acquiring the display content information of the electronic device;
calculating a size ratio value on the second area to the display screen; and
adjusting a proportion of the display content information according to the size ratio value, and displaying the adjusted display content information on the second area.

9. An electronic device, comprising:
a memory, having executable program codes stored therein;
a processor, coupled to the memory;
a display screen, connected with the processor, the display screen comprising a first area and a second area connected with the first area;
a first radio frequency antenna, an orthographic projection of the first radio frequency antenna on the display screen being located in the first area;
a third radio frequency antenna, an orthographic projection of the third radio frequency antenna on the display screen being located in the second area;
wherein the processor invokes the executable program codes stored in the memory to perform a method for processing radio frequency interference, and the method comprises:
acquiring a first signal strength value of the first radio frequency antenna;
stopping the information display on the first area when the first signal strength value is lower than a preset threshold;
acquiring a second signal strength value of the third radio frequency antenna; and
starting the information display on the first area and stopping the information display on the second area, when the second signal strength value is lower than the first signal strength value.

10. The electronic device of claim 9, the method further comprising:
keeping the information display on the second area when determining that the second signal strength value is not lower than the first signal strength value.

11. The electronic device of claim 9, the method further comprising:
acquiring a current time point when the first signal strength value is not lower than the preset threshold;
calculating the duration in which the first signal strength value is not lower than the preset threshold from the time point; and
enabling the information display on the first area when the duration exceeds the preset time threshold.

12. An electronic device, comprising:
a first radio frequency antenna;
a display screen, comprising a first area and an adjacent second area, an orthographic projection of the first radio frequency antenna on the display screen being located in the first area;
a control circuit, configured to control the first radio frequency antenna to obtain a first signal strength value; and
a processor, connected with the first radio frequency antenna, the display screen, and the control circuit, the processor being configured to:
determine whether the first signal strength value is lower than a preset threshold, and
stop the information display on the first area when determining that the first signal strength value is lower than the preset threshold;
acquire display content information of the electronic device;
calculate a size ratio value on the second area to the display screen;
adjust a proportion of the display content information according to the size ratio value, and
display the adjusted display content information on the second area.

13. The electronic device of claim 12, wherein the electronic device further comprises a second radio frequency antenna, the second radio frequency antenna is connected with the processor, the display screen also comprises a third area, an orthographic projection of the second radio frequency antenna on the display screen is located in the third area, and the second area is located between the first area and the third area.

14. The electronic device of claim 13, wherein the control circuit is further configured to control the second radio frequency antenna to obtain a second signal strength value; the processor is further configured to:
  determine whether the second signal strength value is lower than a preset threshold, and
  stop the information display on the third area and make the display screen just use the second area to display information when determining that the second signal strength value is lower than the preset threshold.

15. The electronic device of claim 14, wherein the processor is further configured to:
  acquire a current time point when determining that the second signal strength value is not lower than the preset threshold;
  calculate a duration in which the second signal strength value not lower than the preset threshold from the time point; and
  enable the information display on the third area when the duration exceeds the preset time threshold.

16. The electronic device of claim 14, wherein the processor is further configured to:
  keep the information display on the third area when determining that the second signal strength value is not lower than the preset threshold.

17. The electronic device of claim 12, wherein the electronic device further comprises a third radio frequency antenna, the third radio frequency antenna is connected with the processor, an orthographic projection of the third radio frequency antenna on the display screen is located in the second area.

18. The electronic device of claim 17, wherein the control circuit is further configured to control the third radio frequency antenna to obtain a second signal strength value; the processor is further configured to:
  determine whether the second signal strength value is lower than the first signal strength value, and
  enable the information display on the first area, and stop the information display on the second area when the second signal strength value is lower than the first signal strength value.

19. The electronic device of claim 18, wherein the processor is further configured to:
  keep the information display on the second area when determining that the second signal strength value is not lower than the first signal strength value.

20. The electronic device of claim 12, wherein the processor is further configured to:
  acquire a current time point when determining that the first signal strength value is judged not to be lower than the preset threshold;
  calculate the duration in which the first signal strength value is not lower than the preset threshold from the time point; and
  enable the information display on the first area when the duration exceeds the preset time threshold.

* * * * *